(12) United States Patent
Ishikawa et al.

(10) Patent No.: US 7,103,364 B2
(45) Date of Patent: Sep. 5, 2006

(54) CALL ACCEPTANCE CONTROLLING APPARATUS AND METHOD THEREOF

(75) Inventors: Yoshihiro Ishikawa, Yokosuka (JP); Yoshiaki Ofuji, Yokosuka (JP); Seizo Onoe, Yokohama (JP); Takehiro Nakamura, Yokosuka (JP); Mikio Iwamura, Zushi (JP); Takahiro Hayashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 483 days.

(21) Appl. No.: 10/060,225

(22) Filed: Feb. 1, 2002

(65) Prior Publication Data

US 2002/0107021 A1 Aug. 8, 2002

(30) Foreign Application Priority Data

Feb. 1, 2001 (JP) .............................. 2001-025628

(51) Int. Cl.
*H04Q 7/20* (2006.01)

(52) U.S. Cl. ................... 455/453; 455/436; 455/525; 455/67.11; 370/252; 370/335; 370/329; 370/331

(58) Field of Classification Search ...... 455/435.1–444, 455/450–453, 525, 33.1, 54.1, 54.2, 56.1, 455/67.1, 226.1; 370/328, 332, 331, 339, 370/252, 335, 230, 461, 462
See application file for complete search history.

(56) References Cited

U.S. PATENT DOCUMENTS 5,666,356 A 9/1997 Fleming et al.

6,038,448 A * 3/2000 Chheda et al. ............. 455/436
6,611,506 B1 * 8/2003 Huang et al. ............... 370/329
6,721,568 B1 * 4/2004 Gustavsson et al. ........ 455/450

FOREIGN PATENT DOCUMENTS

| EP | 0 856 955 A2 * | 8/1998 |
|----|----------------|--------|
| JP | 7-23449 | 1/1995 |
| JP | 8-191481 | 7/1996 |
| JP | 9-23474 | 1/1997 |
| JP | 9-69824 | 3/1997 |
| JP | 2001-25048 | 1/2001 |
| WO | WO 98/30057 | 7/1998 |
| WO | WO 99/60797 | 11/1999 |

OTHER PUBLICATIONS

H. Holma, et al., XP–002253937, pp. 214–217, "WCDMA for UMTS", 2000.
L. Jorguseski, et al., IEEE Communications Magazine, vol. 39, No. 2, XP–001006743, pp. 117–123, "Radio Resource Allocation in Third–Generation Mobile Communication Systems", Feb. 1, 2001.

* cited by examiner

*Primary Examiner*—Temica M. Beamer
*Assistant Examiner*—Anthony S. Addy
(74) *Attorney, Agent, or Firm*—Oblon, Spivak, McClelland, Maier & Neustadt, P.C.

(57) ABSTRACT

Priority is given to handover calls over new calls in a mobile communications system using the CDMA method. This is achieved by rejecting requests for new calls in any one of the cases in which: an uplink interference amount estimated if the requested call is accepted exceeds an interference threshold level; a downlink total transmission power estimated if the requested call is accepted exceeds a downlink transmission power threshold; and an amount of spread code resources estimated if the requested call is accepted is lower than a spread code threshold.

50 Claims, 5 Drawing Sheets

CALL ACCEPTANCE CONTROLLING APPARATUS AND METHOD THEREOF

BACKGROUND OF THE INVENTION

1. Field of the Invention

The present invention relates to a call acceptance controlling apparatus and a method for controlling acceptance of new calls and handover calls generated in a cell where communication is provided by a radio channel between a mobile station in the cell and two or more radio base stations that form cells in a mobile communications system that employs a code division multiple access method.

2. Description of the Related Art

Generally a mobile communications system accepts a request for a call to be established by assigning a radio channel. However, in any mobile communications system, the number of available radio channels is limited and, thereby, the number of mobile stations (users) that can communicate simultaneously, i.e., subscriber capacity, is limited. For this reason, when a request for a call exceeding the subscriber capacity is generated, a radio channel cannot be assigned to the requested call, resulting in a so-called lost call.

In a mobile communications system that employs a frequency division multiple access method (FDMA method) and a time division multiple access (TDMA method), for example, fixed radio channels are assigned to each cell formed by a radio base station.

In this case, the number of mobile stations that can communicate simultaneously within a cell is limited by the number of the radio channels assigned to the cell. For this reason, when a request for calls in excess of the number of the radio channels is generated, a call loss occurs.

In a mobile communications system such as above, fixed radio channels are assigned to each cell, making it impossible to flexibly respond to an uneven traffic distribution, location-wise and time-wise. In order to solve the uneven traffic distribution, a method (dynamic channel allocation method) that assigns radio channels dynamically to each cell is sometimes used. In the mobile communications system using this dynamic channel allocation method, a radio channel that satisfies predetermined communication quality (for example, a radio channel with an amount of interference below a predetermined value and a radio channel with CIR being greater than a predetermined value) is assigned. However, when there is no radio channel available, or predetermined communication quality cannot be provided even if a radio channel is available, the radio channel cannot be assigned to the call. Thus, the call is lost.

On the other hand, in a mobile communications system using the code division multiple access (CDMA method), each mobile station shares the same radio frequency band, using a spread code. Under the CDMA method, the radio channel is constituted by the spread code and resistance against interference is strong compared with the narrow-band multiple access method of the FDMA method and the TDMA method. However, when an amount of interference exceeds a certain value, the CDMA has a property that the communication quality deteriorates. For a mobile station using a predetermined spread code, a signal of another mobile station using another spread codes can cause interference.

That is, the subscriber capacity in the mobile communications system using the CDMA method is limited by the amount of interference. For this reason, if a call that will cause the mobile communications system to exceed the subscriber capacity in a certain cell is accepted, communication quality of all mobile stations in the cell and its surrounding cells deteriorates. Here, the amount of interference caused by a communication using a certain spread code with another communication using another spread code is determined by a cross-correlation between these spread codes. For this reason, spread codes are designed so that cross-correlation values becomes sufficiently small.

As regards calls originated in each cell, the calls are classified as new calls that occur by a call origination and handover calls that occur by handover. In the mobile communications system, when a mobile terminal under communication moves from a first cell to a second cell, a radio channel has to be switched from a channel of the first cell to a channel of the second cell. At this time, the call in the first cell turns into a handover call of the second cell. When there is no radio channel assignable to the handover call, the call of the mobile terminal will be compulsorily disconnected in spite of the call being in progress. This forced release has adverse influence on the quality of service.

In order to lessen occurrence of forced disconnections, preparing radio channels exclusively for handover calls is practiced in the narrow-band mobile communications system using the FDMA method or the TDMA method. In the method presented by JP, 7-23449, a plurality of radio channels are divided into a small number of channels that are assigned exclusively to handover calls, a comparatively small number of channels that are assigned to handover calls preferentially, and the rest of a greater number of channels that are assigned to new calls and handover calls without preference. To the new calls, radio channels are assigned according to operating conditions of the radio channels. In this manner, the handover calls can be accepted preferentially and the quality of service can be enhanced.

However, in a mobile communications system using the CDMA method, the subscriber capacity is dependent on an amount of interference rather than available spread code resources. For this reason, the call acceptance method of the narrow-band mobile communications system using the FDMA method or the TDMA method proposed by JP, 7-23449 mentioned above cannot be applied to the mobile communications system using the CDMA method.

SUMMARY OF THE INVENTION

It is a general object of the present invention to provide an apparatus and a method that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by an apparatus and a method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a call acceptance controlling apparatus and a method for accepting a handover call preferentially in the mobile communications system using the CDMA method, based on a maximum interference amount, a maximum transmission power level and an amount of spread code resources available to the mobile communications system, and comparing an estimated interference amount, an estimated transmission power level and an estimated amount of spread code resources available if a request for a call connection is accepted with respective threshold levels.

DESCRIPTION OF THE PREFERRED EMBODIMENTS

In the following, embodiments of the present invention will be described with reference to the accompanying drawings.

Further, the present invention is not limited to these embodiments, but various variations and modifications may be made without departing from the scope of the present invention.

The present application is based on Japanese priority application No. 2001-025628 filed on Feb. 1, 2001 with the Japanese Patent Office, the entire contents of that are hereby incorporated by reference.

Figure 1:
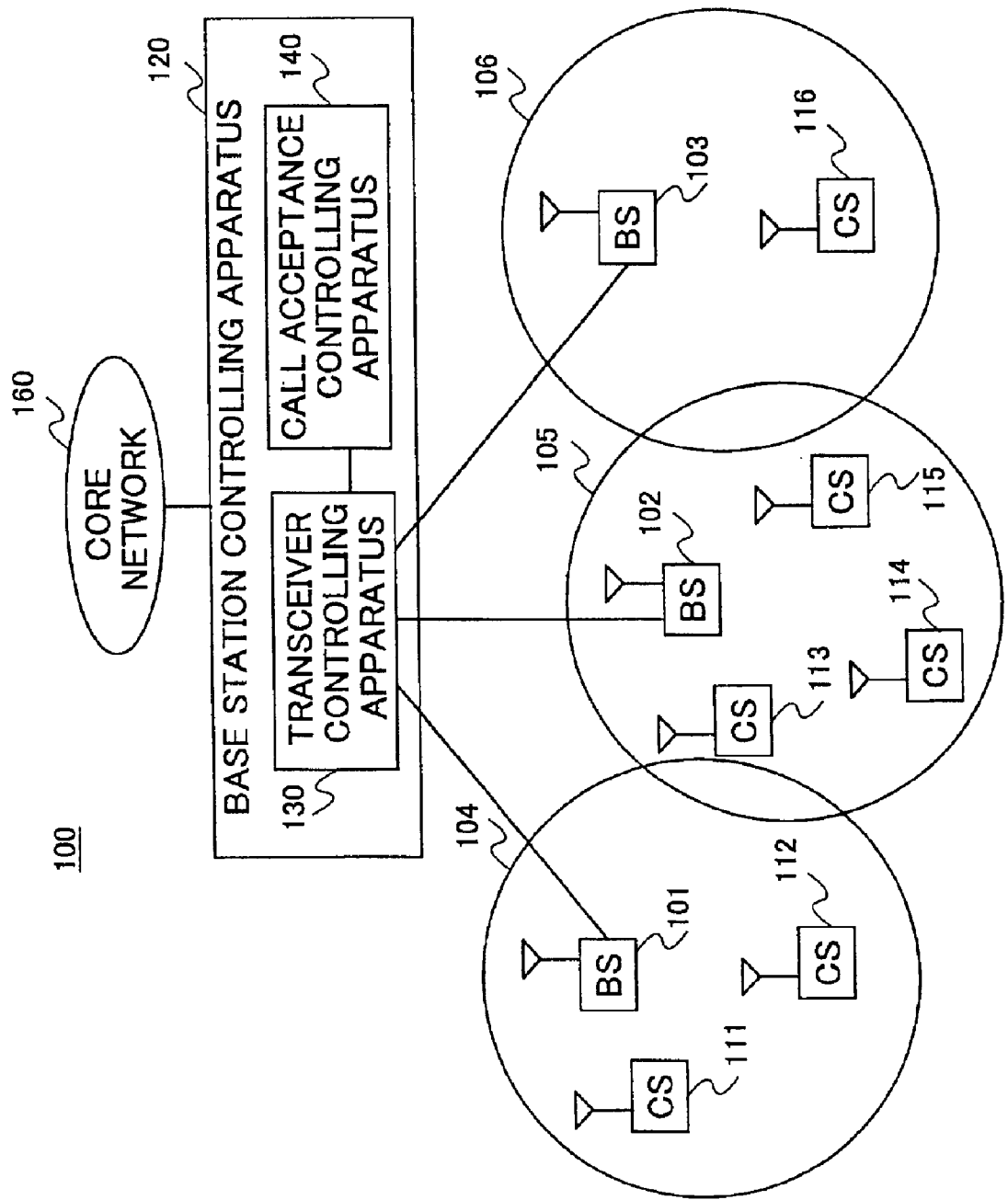
FIG. 1 is a figure showing an example of a structure of a mobile communications system according to the present invention.

FIG. 1 shows an example of a structure of a mobile communications system 100 to which a call acceptance control method and an call acceptance controlling apparatus as embodied in the present invention are applied.

The mobile communications system 100 shown in FIG. 1 includes radio base stations (BS) 101–103, mobile stations (CS) 111 and 112 in a cell 104 formed by the radio base station 101, mobile stations 113–115 in a cell 105 formed by the radio base station 102, a mobile station 116 in a cell 106 formed by the radio base station 103, a base station controlling apparatus 120 that includes a transceiver controlling apparatus 130 and a call acceptance controlling apparatus 140, and a core network 160.

When a mobile station under communication needs to change a radio channel due to moving from a first cell to a second cell, that is, when a handover call is generated and control thereof is required, the mobile communications system 100 gives the handover call priority in assigning a radio channel over a new call that is requested of the second cell either by a new call origination in the second cell or by a call arrival to the second cell.

For example, when the mobile station 112 in the cell 104 formed by the radio base station 101 moves to the cell 105 formed by the radio base station 102, generating a handover call, the mobile communications system 100 gives the handover call in the cell 105 priority in assigning a radio channel over a new call that is requested of the cell 105 either by an originated call or by an arriving call.

Figure 2:
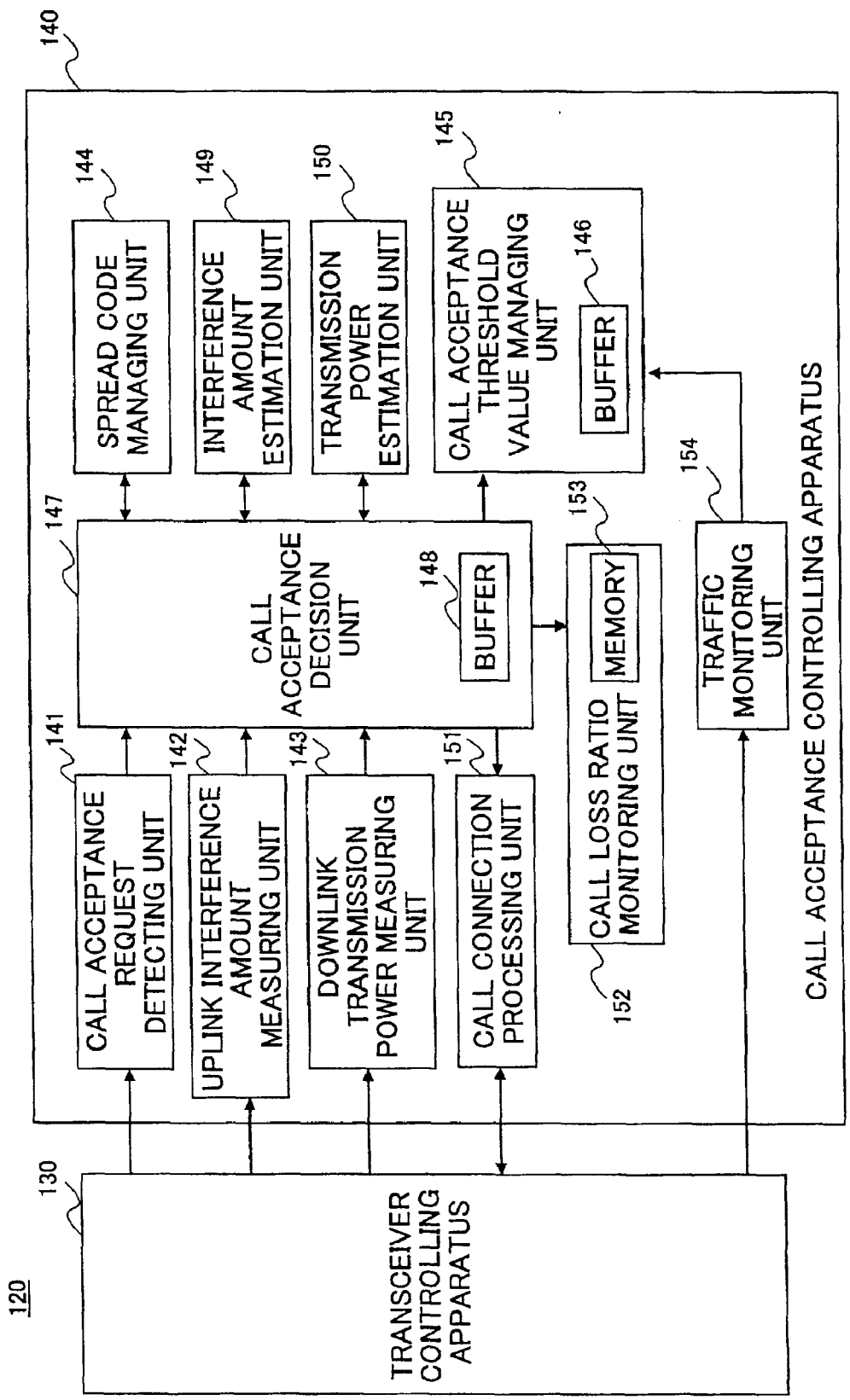
FIG. 2 is a figure showing an example of a structure of a base station controlling apparatus that includes a call acceptance controlling apparatus according to the present invention.

FIG. 2 shows an example of a structure of the base station controlling apparatus 120. The base station controlling apparatus 120 includes the transceiver controlling apparatus 130 and the call acceptance controlling apparatus 140. The transceiver controlling apparatus 130 is connected to each of the radio base stations 101–103 and the core network 160 via wired circuits, and controls exchange of control signals and user data between each of the mobile stations 111–116 in the cells 104-106 that the radio base stations 101–103 form, respectively, and the core network 160.

The call acceptance controlling apparatus 140 is connected to the transceiver controlling apparatus 130, and controls such that priority is given to a handover call over a new call, when there is a call acceptance request from the mobile stations 111–116 or the core network 160, based on limiting factors of subscriber capacity (the number of mobile stations that can communicate simultaneously) such as an amount of interference in each uplink radio channel from a mobile station to a radio base station in each cell, a total downlink transmission power level from the radio base station to the mobile stations in each cell, and an available amount of spread code resources in each radio base station forming each cell.

The call acceptance controlling apparatus 140 includes a call acceptance request detecting unit 141, an uplink interference amount measuring unit 142, a downlink transmission power measuring unit 143, a spread code managing unit 144, a call acceptance threshold managing unit 145, a call acceptance decision unit 147, an interference amount estimation unit 149, a transmission power estimation unit 150, a call connection processing unit 151, a lost call ratio monitoring unit 152, and a traffic monitoring unit 154.

The call acceptance request detecting unit 141 detects a call acceptance request from one of the mobile stations 111–116, and a call acceptance request from the core network 160, and outputs the call acceptance request to the call acceptance decision unit 147. The call acceptance request includes classification information that specifies whether the call acceptance request is for a new call or for a handover call, mobile station identification information that identifies a mobile station to which a connection is to be established, and radio base station identification information that identifies a radio base station that forms the cell in which the mobile station is communicating.

The uplink interference amount measuring unit 142 measures an amount of interference in each uplink radio channel (called "uplink interference amount") from each of the mobile stations 111–116 to each respective radio base stations 101–103 in each of respective cells 104–106 formed by each of respective radio base stations 101–103. The measured uplink interference amount is outputted to the call acceptance decision unit 147. To the outputted information of the uplink interference amount, the corresponding mobile station identification information, and the radio base station identification information of the radio base station in communication with the mobile station are attached.

The downlink transmission power measuring unit 143 measures a total downlink transmission power transmitted from each of the radio base stations 101–103 in the cells 104–106, respectively, to the mobile stations 111–116 in the respective cells formed by the respective radio base stations

101–103 (called "total downlink transmission power"), and outputs measuring results to the call acceptance decision unit 147. To the outputted information of the total transmission power, the radio base station identification information of the radio base station that forms the corresponding cell is attached.

The spread code managing unit 144 manages usage conditions of the spread code resources assigned to each of the cells 104–106 that are formed by the radio base stations 101–103, respectively. The usage condition of the spread code resources is updated whenever a spread code is newly assigned to a call connected, and a spread code currently used by a call is released by termination of the call.

The call acceptance threshold managing unit 145 stores threshold values (new call acceptance threshold) in a buffer 146, which are referenced when deciding whether new calls are accepted. The new call acceptance threshold values include a threshold value of the uplink interference, up to which a new call is accepted ("interference threshold"), a threshold value of the downlink total transmission power, up to which a new call is accepted ("transmission power threshold"), and a threshold value of the spread code resources, down to which a new call is accepted ("spread code threshold").

Among the threshold values above, the transmission power threshold and the spread code threshold are defined for every radio base station, i.e., every cell, and are stored in the buffer 146 with respective radio base station identification information of a radio base station that forms a cell. Here, the interference threshold value is set at a value lower than a maximum value at which a communication is possible in the mobile communications system 100. Similarly, the transmission power threshold is set at a value lower than a maximum transmission power of each radio base station, and the spread code threshold is set at a value lower than an amount of the spread code resources assigned to each cell.

The interference threshold value of the cells may be set at a single uniform value throughout the mobile communications system 100, or alternatively, at values different from cell to cell. When different interference threshold values are assigned to each cell, the interference threshold values are stored in the buffer 146 with the radio base station identification information of the radio base station that forms the cell. The interference threshold value is set at a value lower than the maximum amount of interference at which a communication is possible. In the following, descriptions are made on the premise that different interference threshold values are set to each cell.

The call acceptance decision unit 147 determines whether a call acceptance request from any one of the mobile stations 111–116 and the core network 160, that is supplied from the call acceptance request detecting unit 141 is acceptable.

Specifically, when a call acceptance request is supplied, the call acceptance decision unit 147 determines whether the call acceptance request is of a new call, or of a handover call, using the classification information included in the call acceptance request.

In the case that the call acceptance request is of a new call, the call acceptance decision unit 147 extracts an uplink interference value corresponding to the radio base station whose identification information is included in the call acceptance request out of the uplink interference values stored in the uplink interference measuring unit 142, and outputs the extracted value to the interference amount estimation unit 149. The interference amount estimation unit 149 estimates an uplink interference amount in the case that the call acceptance request is accepted and the call is established, based on the uplink interference amount extracted by the call acceptance decision unit 147, and outputs the estimated uplink interference amount to the call acceptance decision unit 147.

Next, the call acceptance decision unit 147 determines whether an estimated uplink interference amount is greater than an interference threshold value of the radio base station whose identification information is included in the call acceptance request, which is stored in and read from the call acceptance threshold managing unit 145.

If the estimated interference threshold value is greater than the interference threshold value read, the call acceptance decision unit 147 rejects the call, making the call lost. Otherwise, the call acceptance decision unit 147 extracts a downlink total transmission power level of the radio base station whose identification information is included in the call acceptance request out of downlink total transmission power levels measured by the downlink transmission power measuring unit 143, and outputs to the transmission power estimation unit 150. The transmission power estimation unit 150 estimates a downlink total transmission power level in the case that the call acceptance request is accepted and the call is established, based on the downlink total transmission power level extracted by the call acceptance decision unit 147, and outputs the estimated downlink total transmission power to the call acceptance decision unit 147.

Next, the call acceptance decision unit 147 reads a transmission power threshold value of the radio base station whose identification information is included in the call acceptance request out from the transmission power threshold values currently stored in the call acceptance threshold managing unit 145, and determines whether the downlink total transmission power estimated by the transmission power estimation unit 150 is greater than the transmission power threshold value.

If the estimated downlink total transmission power is greater than the transmission power threshold value, the call acceptance decision unit 147 rejects the call, making the call lost. Otherwise, the call acceptance decision unit 147 extracts a spread code threshold of the radio base station whose identification information is included in the call acceptance request out of the spread code threshold values currently stored in the call acceptance threshold managing unit 145, and queries the spread code managing unit 144 spread code resources usage conditions in the cell of the radio base station whose identification information is included in the call acceptance request. Then, the call acceptance decision unit 147 checks whether an available amount of the spread code resources of the cell is smaller than the spread code threshold value.

If the available amount of the spread code resources is below the spread code threshold value, the call acceptance decision unit 147 rejects the call, making the call lost. Otherwise, the call acceptance decision unit 147 accepts the call acceptance request, and outputs the mobile station identification information and the radio base station identification information that are included in the call acceptance request to the call connection processing unit 151. The call connection processing unit 151 performs various processing required for establishing a call connection based on the mobile station identification information and the radio base station identification information.

In the above, the case that the call acceptance request is of a new call has been described. Conversely, the case that the call acceptance request is of a handover call will be described hereunder.

If the call acceptance request is of a handover call, the call acceptance decision unit 147 extracts an uplink interference value of the radio base station whose identification information is included in the call acceptance request out of the uplink interference values measured by the uplink interference amount measuring unit 142, and outputs the uplink interference value to the interference amount estimation unit 149. The interference amount estimation unit 149 estimates an amount of interference if the call acceptance request is accepted and the call is established, based on the uplink interference value extracted by the call acceptance decision unit 147, and the estimated uplink interference value is outputted to the call acceptance decision unit 147.

Next, the call acceptance decision unit 147 checks whether the uplink interference value estimated by the interference amount estimation unit 149 reaches the maximum amount of interference with which a communication is possible. If the estimated uplink interference value reaches the maximum interference value with which a communication is possible, the call acceptance decision unit 147 stores a flag "1" to a buffer 148 such that the call acceptance request is rejected, making the call lost.

Further, the call acceptance decision unit 147 extracts a downlink total transmission power of the radio base station whose identification information is included in the call acceptance request out of the downlink total transmission power values measured by the downlink transmission power measuring unit 143, and outputs to the transmission power estimation unit 150. The transmission power estimation unit 150 estimates a downlink total transmission power if the call acceptance request is accepted and the call is established, based on the downlink total transmission power extracted by the call acceptance decision unit 147, and outputs the estimated downlink total transmission power to the call acceptance decision unit 147.

Next, the call acceptance decision unit 147 checks whether the downlink total transmission power estimated by the transmission power estimation unit 150 reaches the maximum transmission power of the radio base station whose identification information is included in the call acceptance request.

If the estimated downlink total transmission power reaches the maximum transmission power, the call acceptance decision unit 147 stores a flag "1" to the buffer 148 such that the call acceptance request is rejected and the requested call is lost.

Further, the call acceptance decision unit 147 queries the spread code managing unit 144 spread code resources usage conditions in the cell formed by the radio base station whose identification information is included in the call acceptance request, and checks whether there are any remaining spread codes available among the spread codes assigned to the cell. If there are no spread codes available, the call acceptance decision unit 147 stores a flag "1" to the buffer 148 such that the call acceptance request is rejected and the requested call is lots.

After processing as above described, the call acceptance decision unit 147 checks whether the buffer 148 stores the flag "1". If affirmative, the call acceptance decision unit 147 rejects the call acceptance request, making the call lost.

On the other hand, if the flag "1" is not stored in the buffer 148, the call acceptance decision unit 147 accepts the call acceptance request, and outputs the mobile station identification information and radio base station identification information that are included in the call acceptance request to the call connection processing unit 151. The call connection processing unit 151 performs various processes required for establishing a call connection, based on the mobile station identification information and the radio base station identification information.

Alternatively, a decision whether or not the call acceptance request is accepted can be made by determining whether the uplink interference amount detected by the uplink interference amount measuring unit 142 reaches the maximum interference amount at which a communication is possible or the interference threshold value, and by determining whether the downlink total transmission power detected by the downlink transmission power measuring unit 143 reaches the maximum transmission power or the transmission power threshold value of the radio base station, rather than by estimating the uplink interference amount and the downlink total transmission power level if the call is accepted and the requested connection is made, and comparing the estimated amount and the estimated power level with the respective maximum values or the respective threshold values, as described previously.

The lost call ratio monitoring unit 152 calculates a ratio of lost handover calls that occurred in the cell formed by the radio base station identified by the radio base station identification information included in the call acceptance request, stores the ratio in a memory 153, and outputs the ratio to the call acceptance threshold managing unit 145 at predetermined times.

The call acceptance threshold managing unit 145 decreases the interference threshold value in the buffer 146 when the lost call ratio of handover calls calculated by the lost call ratio monitoring unit 152 is greater than a first predetermined value, and when the lost call ratio is less than a second predetermined value (here, the second predetermined value<the first predetermined value), the interference threshold value in the buffer 146 is increased.

The call acceptance threshold managing unit 145 decreases the transmission power threshold in the buffer 146 when the lost call ratio of handover calls calculated by the lost call ratio monitoring unit 152 is greater than a third predetermined value, and when the ratio is less than a fourth predetermined value (here, the fourth predetermined value<the third predetermined value), the transmission power threshold in the buffer 146 is increased. Similarly, the call acceptance threshold managing unit 145 increases the spread code threshold in the buffer 146 when the lost call ratio of handover calls calculated by the lost call ratio monitoring unit 152 is greater than a fifth predetermined value, and decreases the spread code threshold in the buffer 146 when the lost call ratio of handover calls calculated by the lost call ratio monitoring unit 152 is less than a sixth predetermined value (here, the sixth predetermined value<the fifth predetermined value).

The traffic monitoring unit 154 supervises communication load of each of the radio base stations 101–103, and outputs relative information thereof to the call acceptance threshold managing unit 145. The communication load of a radio base station is defined by the number of calls, transmission speed of the calls and transmission power of the radio base station.

In reference to a predetermined radio base station, when communication load in a radio base station of a cell adjacent to the cell of the predetermined radio base station is greater than a seventh predetermined value, the call acceptance threshold managing unit 145 decreases the interference threshold value corresponding to the predetermined radio base station, and when the communication load is less than an eighth predetermined value (here, the eighth predetermined value<the seventh predetermined value), the interference threshold value corresponding to the predetermined radio base station is increased.

Similarly, when the communication load in the radio base station of the cell adjacent to the cell of the predetermined radio base station is greater than a ninth predetermined value, the call acceptance threshold managing unit 145 decreases the transmission power threshold corresponding to the predetermined radio base station, and when the communication load is less than a tenth predetermined value (here, the tenth predetermined value<the ninth predetermined value), the transmission power threshold corresponding to the predetermined radio base station is increased. Similarly, the call acceptance threshold managing unit 145 increases the spread code threshold corresponding to the predetermined radio base station when the communication load in the radio base station of the adjacent cell of the cell of the predetermined radio base station is greater than an eleventh predetermined value, and when the communication load is less than a twelfth predetermined value (here, the twelfth predetermined value<the eleventh predetermined value), the spread code threshold corresponding to the predetermined radio base station is decreased.

Figure 3:
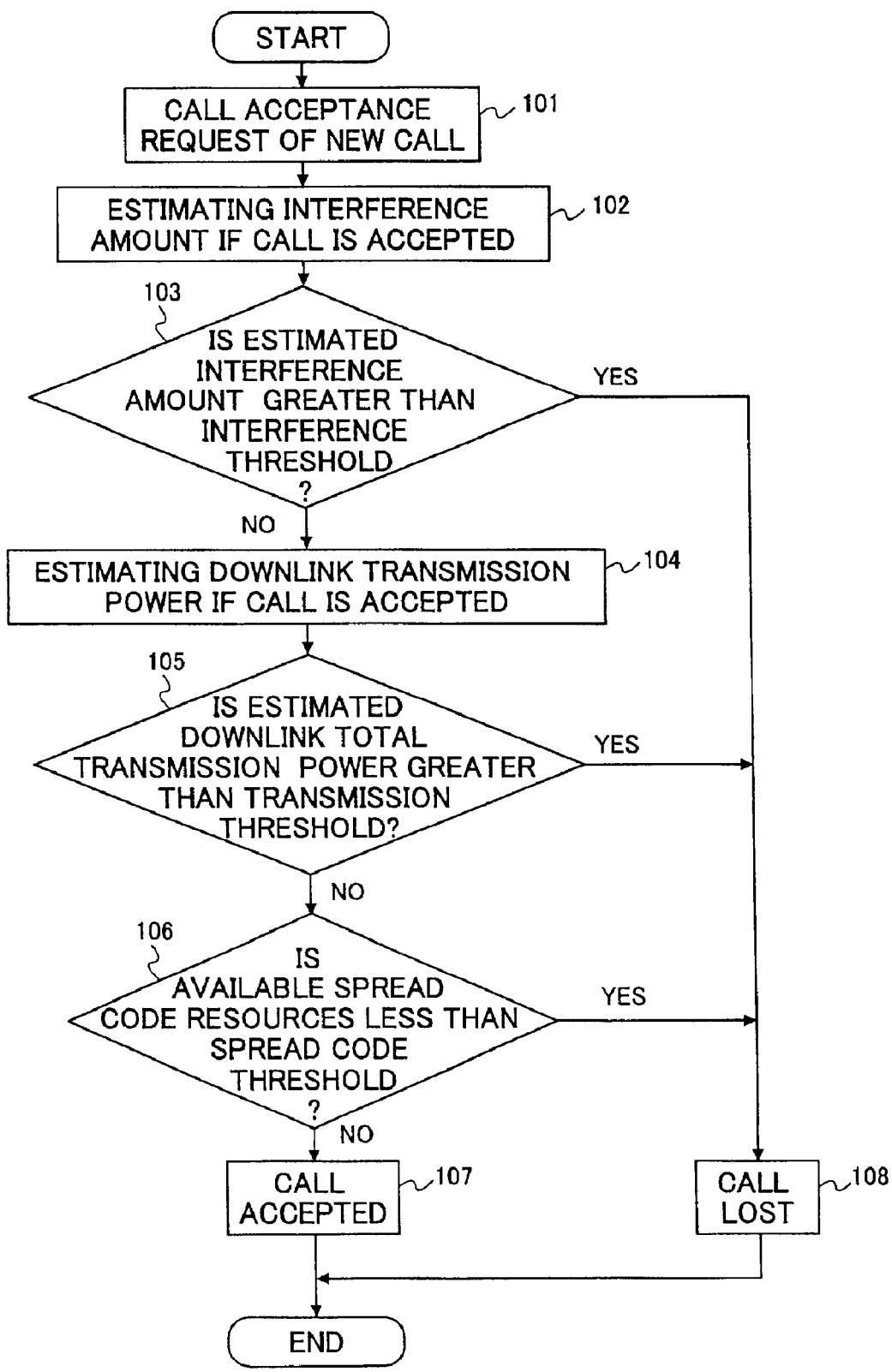
FIG. 3 is a flowchart showing an example of operations of the call acceptance controlling apparatus when there is a call acceptance request for a new call according to the present invention.

Next, operations of the call acceptance controlling apparatus 140 will be explained using a flowchart. FIG. 3 is a flowchart that shows an example of operations of the call acceptance controlling apparatus 140 when there is a call acceptance request for a new call.

When a call acceptance request is inputted, the call acceptance decision unit 147 in the call acceptance controlling apparatus 140 determines whether the call acceptance request is of a new call, or of a handover call, using the classification information included in the call acceptance request.

If the call acceptance request is of a new call (step 101), the call acceptance decision unit 147 outputs an uplink interference amount of a radio base station whose identification information is included in the call acceptance request out of the uplink interference values measured by the uplink interference amount measuring unit 142 to the interference amount estimation unit 149. The interference amount estimation unit 149 estimates an uplink interference amount in the case that the call acceptance request is accepted and the call is established, based on the uplink interference amount provided by the call acceptance decision unit 147, and the estimated amount is outputted to the call acceptance decision unit 147 (step 102).

Next, the call acceptance decision unit 147 reads an interference threshold value of the radio base station whose identification information is included in the call acceptance request from the call acceptance threshold managing unit 145, and checks whether the interference value estimated by the interference estimation unit 149 is greater than the interference threshold value (step 103).

If the estimated uplink interference value is greater than the interference threshold that is read, the call acceptance decision unit 147 rejects the call acceptance request and makes the call lost (step 108). On the other hand, if the estimated uplink interference value is smaller than the interference threshold value that is read, the call acceptance decision unit 147 extracts a value of the downlink total transmission power of the radio base station whose identification information is included in the call acceptance request out of values of downlink total transmission power measured by the downlink transmission power measuring unit 143, outputs the value to the transmission power estimation unit 150. The transmission power estimation unit 150 estimates a downlink total transmission power in the case that the call acceptance request is accepted and the call is established, based on the total transmission power supplied by the call acceptance decision unit 147, and the estimated total transmission power is outputted to the call acceptance decision unit 147 (step 104)

Next, the call acceptance decision unit 147 reads the transmission power threshold of the radio base station whose identification information is included in the call acceptance request from the call acceptance threshold managing unit 145, and checks whether the downlink total transmission power estimated by the transmission power estimation unit 150 is greater than the transmission power threshold (step 105).

If the estimated total transmission power is greater than the transmission power threshold, the call acceptance decision unit 147 rejects the call acceptance request, making the call lost (step 108). On the other hand, if the estimated downlink total transmission power is smaller than the transmission power threshold, the call acceptance decision unit 147 extracts a spread code threshold of the radio base station whose identification information is included in the call acceptance request from the call acceptance threshold managing unit 145, and queries the spread code managing unit 144 spread code resources usage conditions in the cell of the radio base station whose identification information is included in the call acceptance request. A check is made as to whether an amount of the spread code resources available in the cell is below the spread code thresholds (step 106).

If the amount of the spread code resources available is below the spread code threshold, the call acceptance decision unit 147 rejects the call acceptance request, making the call lost (step 108). On the other hand, if the amount of the spread code resources available is greater than the spread code threshold, the call acceptance decision unit 147 accepts the call acceptance request, and outputs the mobile station identification information and the radio base station identification information that are included in the call acceptance request to the call connection processing unit 151. The call connection processing unit 151 performs various processes required for establishing a call connection based on the mobile station identification information and the radio base station identification information (step 107).

Figure 4:
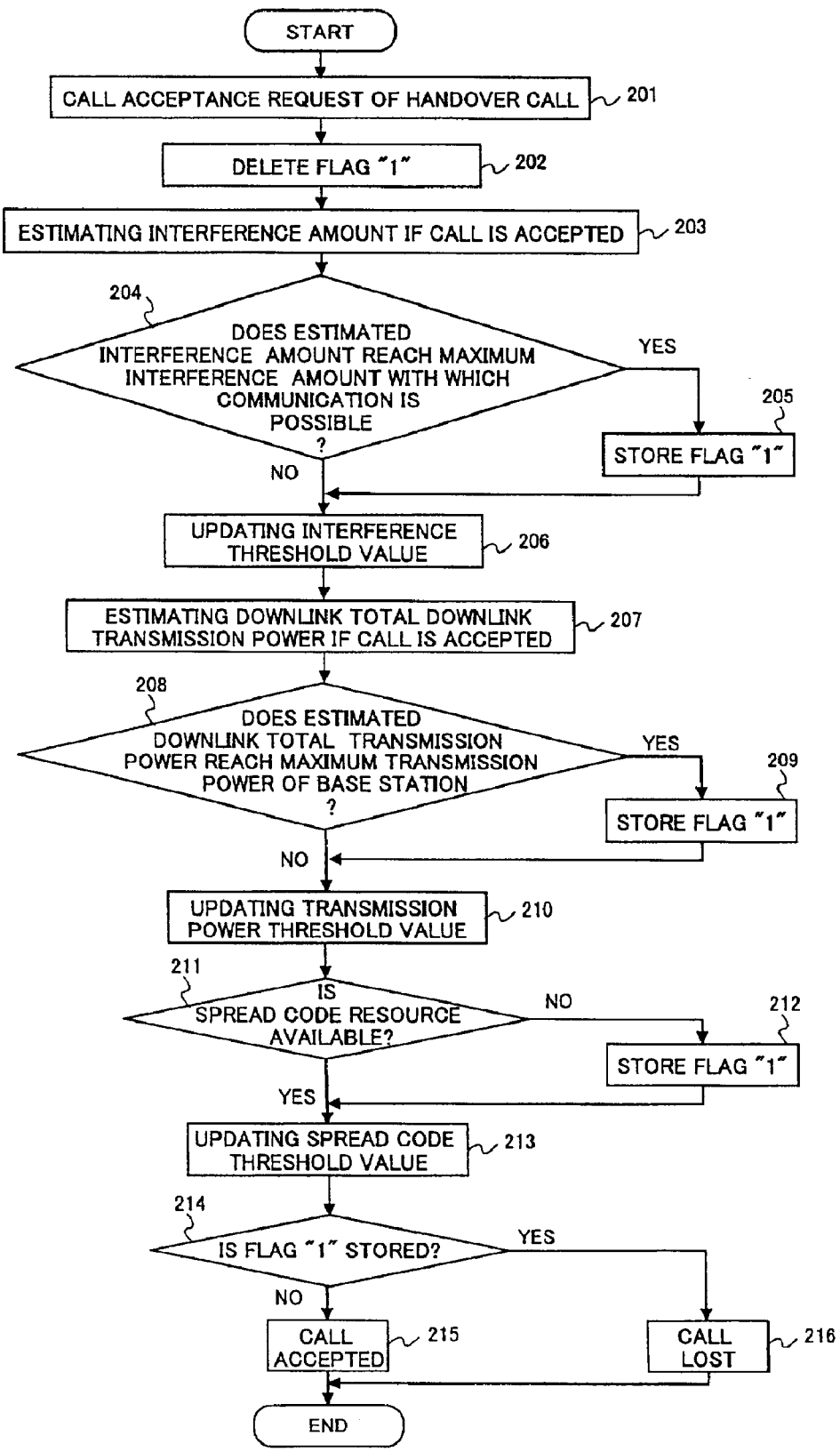
FIG. 4 is a flowchart showing an example of operations of the call acceptance controlling apparatus when there is a call acceptance request for a handover call according to the present invention.

FIG. 4 is a flowchart that shows an example of operations of the call acceptance controlling apparatus 140 in the case that the call acceptance request is of a handover call.

When a call acceptance request is inputted, the call acceptance decision unit 147 in the call acceptance controlling apparatus 140 determines whether the call acceptance request is of a new call, or of a handover call, using the classification information included in the call acceptance request.

When a call acceptance request is determined to be of a handover call (step 201), the call acceptance decision unit 147 checks whether a flag "1" is stored in the buffer 148. If the flag "1" is stored, the flag is eliminated (step 202).

Next, the call acceptance decision unit 147 extracts an uplink interference amount of a radio base station whose identification information is included in the call acceptance request from uplink interference amounts measured by the uplink interference amount measuring unit 142, and outputs the uplink interference amount to the interference amount estimation unit 149. The interference amount estimation unit 149 estimates an uplink interference amount in the case that the call acceptance request is accepted and the call is established, based on the amount of uplink interference supplied by the call acceptance decision unit 147, and outputs the estimated uplink interference amount to the call acceptance decision unit 147 (step 203).

Next, the call acceptance decision unit 147 checks whether the uplink interference amount estimated by the interference amount estimation unit 149 reaches the maximum amount of the interference with which a communication is possible (step 204). If the estimated uplink interference amount reaches the maximum interference amount with which a communication is possible, the call acceptance decision unit 147 stores a flag "1" to the buffer 148 (step 205).

In the case that it is determined that the estimated interference amount does not reach the maximum interference amount with which a communication is possible in the step 204, or in the case that the flag "1" is stored in the buffer 148, the call acceptance threshold managing unit 145 updates the interference threshold value in the buffer 146 (step 206). A more detailed description in this matter is given later.

Next, the call acceptance decision unit 147 extracts a value of a downlink total transmission power of a radio base station whose identification information is included in the call acceptance request from the downlink total transmission power values measured by the downlink transmission power measuring unit 143, and transmits the value to the transmission power estimation unit 150. The transmission power estimation unit 150 estimates a downlink total transmission power in the case that the call acceptance request is accepted and the call is established, based on the downlink total transmission power supplied from the call acceptance decision unit 147, and outputs the estimated downlink total transmission power to the call acceptance decision unit 147 (step 207)

Next, the call acceptance decision unit 147 checks whether or not the downlink total transmission power estimated by the interference amount estimation unit 149 reaches the maximum transmission power of the radio base station identified by the radio base station identification information included in the call acceptance request (step 208).

If the estimated downlink total transmission power reaches the maximum transmission power of the radio base station, the call acceptance decision unit 147 stores a flag "1" to the buffer 148 (step 209).

If it is determined that the estimated total transmission power has not reached the maximum transmission power of the radio base station at the step 208, or if the flag "1" is stored in the buffer 148 at the step 209, the call acceptance threshold managing unit 145 updates the transmission power threshold in the buffer 146 (step 210).

Next, the call acceptance decision unit 147 queries the spread code managing unit 144 spread code resources usage conditions of the radio base station whose radio base station identification information is included in the call acceptance request, and checks whether there are spread code resources available in the cell (step 211). If there are no spread code resources available, the call acceptance decision unit 147 stores a flag "1" in the buffer 148 (step 212).

If it is determined that there are spread code resources available in the step 211, or the flag "1" is stored in the buffer 148 at the step 212, the call acceptance threshold managing unit 145 updates the spread code threshold in the buffer 146 (step 213).

Next, the call acceptance decision unit 147 checks whether the flag "1" is stored in the buffer 148 (step 214).

If the flag "1" is not stored, the call acceptance decision unit 147 accepts the call acceptance request, and outputs the mobile station identification information and the radio base station identification information that are included in the call acceptance request to the call connection processing unit 151. The call connection processing unit 151 performs various processes required for establishing a call connection based on the mobile station identification information and the radio base station identification information (step 215). On the other hand, if the flag "1" is stored, the call acceptance decision unit 147 rejects the call acceptance request, making the call lost (step 216).

Figure 5:
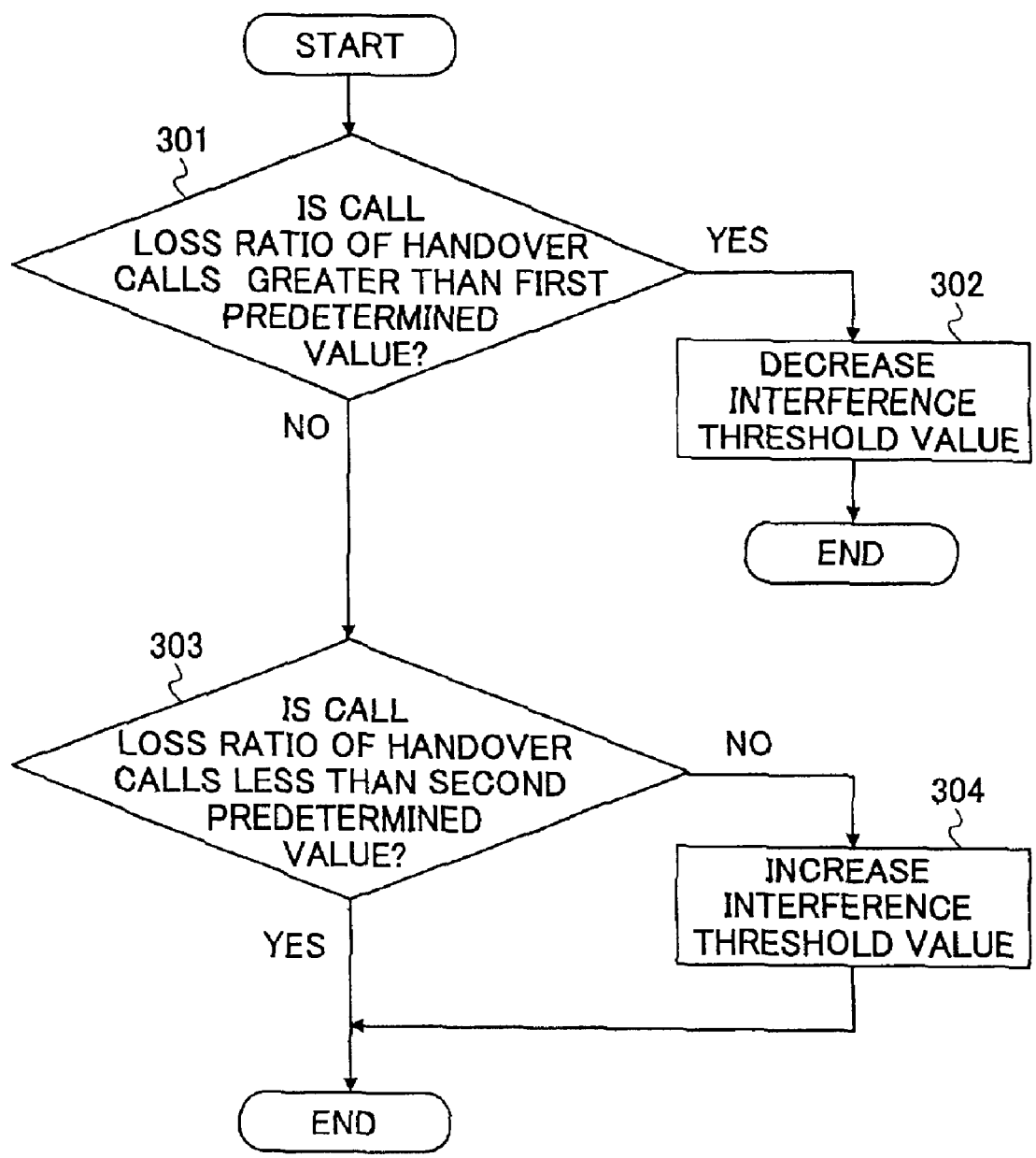
FIG. 5 is a flowchart showing an example of operations of the call acceptance controlling apparatus in the case of updating an interference threshold value according to the present invention.

FIG. 5 is a flowchart that shows an example of operations of the call acceptance controlling apparatus 140 in the case of updating the interference threshold value in the step 206 shown in FIG. 4. The lost call ratio monitoring unit 152 in the call acceptance controlling apparatus 140 calculates a ratio of lost handover calls, which occurred in a cell formed by the radio base station identified by the radio base station identification information included in the call acceptance request, and outputs the ratio to the call acceptance threshold managing unit 145. The call acceptance threshold managing unit 145 checks whether the lost call ratio of handover calls calculated by the lost call ratio monitoring unit 152 is greater than a first predetermined value (step 301).

If the ratio of lost calls of the handover calls is greater than the first predetermined value, the call acceptance threshold managing unit 145 decreases the interference threshold value in the buffer 146 (step 302). On the other hand, if the ratio of lost calls of the handover calls is smaller than the first predetermined value, the call acceptance threshold managing unit 145 checks whether the ratio of lost calls is less than a second predetermined value (step 303).

If the ratio of lost calls of the handover calls is less than the second predetermined value, the call acceptance threshold managing unit 145 increases the interference threshold value in the buffer 146 (step 304). On the other hand, if the ratio of lost calls of the handover calls is greater than the second predetermined value, the call acceptance threshold managing unit 145 does not update the interference threshold value, but rather finishes the process.

As to updating of the transmission power threshold, operations similar to the flowchart shown in FIG. 5 are performed. As to updating the spread code threshold, operations similar to the flowchart shown in FIG. 5 are performed, except that the spread code threshold is increased in the step 302, and the spread code threshold is decreased in the step 304.

As mentioned above, in the mobile communications system 100 of the embodiment, the call acceptance controlling apparatus 140 is provided with the threshold value of the uplink interference amount (the interference threshold value), the threshold value of the total transmission power (transmission power threshold) and the threshold value of spread code resources (spread code threshold) at which a new call can be accepted. When there is a call acceptance request for a new call, the request shall be rejected if: an estimated uplink interference amount, if the call is accepted, is greater than the interference threshold value; an estimated downlink transmission power, if the call is accepted, is greater than the transmission power threshold value; or an estimated amount of the spread code resources, if the call is accepted, is less than the spread code threshold value. That is, conditions for accepting a call acceptance request are stricter for a new call than for a handover call, thereby, priority is given to a handover call over a new call, enabling the mobile communications system 100 to suppress call losses of handover calls.

Moreover, in the mobile communications system 100 of the embodiment, the call acceptance controlling apparatus 140 increases the spread code threshold value and decreases the interference threshold value and the transmission power threshold value, when the ratio of lost calls of the handover calls becomes great, and when the ratio of lost calls of the handover calls is small, the interference threshold value and the transmission power threshold value are increased, and the spread code threshold value is decreased. In this manner, an excessive degree of priority assigned to handover calls is avoided, thereby lost calls of new calls are suppressed.

In the mobile communications system 100 of the embodiment, the call acceptance controlling apparatus 140 predicts calls that are likely to become handover calls and attempts to secure successful handing over, which is realized by decreasing the interference threshold value and the transmission power threshold value and increasing the spread code threshold value corresponding to a predetermined cell when communication load at a radio base station that forms a cell adjacent to the cell formed by the predetermined radio base station is heavy, and by increasing the interference threshold value and the transmission power threshold value and decreasing the spread code threshold value when the communication load corresponding to the cell adjacent to the predetermined radio base station is light.

In the embodiment mentioned above, the call acceptance controlling apparatus 140 is built in the base station controlling apparatus 120, however, the call acceptance controlling apparatus 140 may be separated from the base station controlling apparatus 120. Although updating of the call acceptance threshold in the embodiment is performed whenever a call acceptance request for a handover call occurs, the updating may be performed in every predetermined number of call acceptance requests of handover calls. Further, an average of the ratio of lost calls of the handover calls may be used as a base on which the call acceptance threshold is updated. Alternatively, the updating of the call acceptance threshold may be performed in every predetermined period.

As described above, the present invention provides a priority handling of handover calls over new calls in a communication through a radio channel between two or more radio base stations that form cells, and mobile stations in the cells, by managing the handover calls and the new calls that occur in a cell such that acceptance of the new calls is limited before one of the following events occurs, i.e., that the amount of uplink interference in a radio channel from a mobile station to the radio base station reaches a limit value predetermined in the mobile communications system, that the downlink total transmission power reaches a predetermined value set as a limit in the mobile communications system, and that the spread code resources in the radio base station become unavailable.

What is claimed is:

1. In a mobile communications system using a code division multiple access method, a call acceptance controlling apparatus for controlling acceptance of new calls and handover calls when a communication through a radio channel is performed between a mobile station in a cell and two or more radio base stations each forming a cell, the call acceptance controlling apparatus comprising:

new call acceptance limiting means for restricting acceptance of a new call before any one of the following events takes place, namely, an unlink interference amount in each radio channel from each mobile station that communicates with a radio base station to the radio base station reaching a predetermined maximum interference amount of the mobile communications system, a downlink total transmission power from the radio base station to mobile stations reaching a predetermined maximum power level of the mobile communications system, and an amount of spread code resources available in the radio base station reaching null, wherein the new call acceptance limiting means restricts acceptance of a new call before the uplink interference amount of a radio channel reaches the predetermined maximum interference amount of the mobile communications system, rejecting the new call to make the new call a lost call, when an uplink interference amount of any radio channel exceeds a first threshold value, comprising:

interference amount measuring means for measuring an interference amount of each uplink radio channel from a mobile station to a radio base station when there is a request for a new call, and interference amount checking means for determining whether an interference amount of any radio channel measured by the interference amount measuring means is greater than the first threshold value that is defined as being smaller than the predetermined maximum interference amount of the mobile communications system.

2. The call acceptance controlling apparatus as claimed in claim 1, further comprising first threshold adjustment means for increasing and decreasing the first threshold value, based on a lost call ratio of handover calls.

3. The call acceptance controlling apparatus as claimed in claim 2, wherein the first threshold adjustment means decreases the first threshold value when the lost call ratio of the handover calls is greater than a first predetermined value, and increases the first threshold value when the lost call ratio of the handover calls is smaller than a second predetermined value that is defined as being smaller than the first predetermined value.

4. The call acceptance controlling apparatus as claimed in claim 1, further comprising:

communication load measuring means for measuring a communication load of a radio base station which forms a cell adjacent to the cell formed by the radio base station concerned, and second threshold adjustment means for increasing and decreasing the first threshold value, based on the communication load measured by the communication load measuring means.

5. The call acceptance controlling apparatus as claimed in claim 4, wherein the second threshold adjustment means decreases the first threshold value when the communication load measured by the communication load measuring means is greater than a seventh predetermined value, and increases the first threshold value when the communication load measured by the communication load measuring means is smaller than an eighth predetermined value that is defined as being smaller than the seventh predetermined value.

6. In a mobile communications system using a code division multiple access method, a call acceptance controlling apparatus for controlling acceptance of new calls and handover calls when a communication through a radio channel is performed between a mobile station in a cell and two or more radio base stations each forming a cell, the call acceptance controlling apparatus comprising:

new call acceptance limiting means for restricting acceptance of a new call before any one of the following events takes place, namely.
an uplink interference amount in each radio channel from each mobile station that communicates with a radio base station to the radio base station reaching a predetermined maximum interference amount of the mobile communications system,
a downlink total transmission power from the radio base station to mobile stations reaching a predetermined maximum power level of the mobile communications system, and
an amount of spread code resources available in the radio base station reaching null,
wherein the new call acceptance limiting means restricts acceptance of a new call before the uplink interference amount of a radio channel reaches the predetermined maximum interference amount of the mobile communications system, rejecting the new call to make the new call a lost call, when an uplink interference amount of any radio channel exceeds a second threshold value, comprising:
interference amount estimating means for estimating an interference amount of each uplink radio channel if a request for a new call is accepted, and
interference amount checking means for determining whether an interference amount of any radio channel estimated by the interference amount estimating means is greater than the second threshold value that is defined as being smaller than the predetermined maximum interference amount of the mobile communications system.

7. The call acceptance controlling apparatus as claimed in claim 6, further comprising first threshold adjustment means for increasing and decreasing the second threshold value, based on a lost call ratio of handover calls.

8. The call acceptance controlling apparatus as claimed in claim 7, wherein the first threshold adjustment means decreases the second threshold value when the lost call ratio of the handover calls is greater than a first predetermined value, and increases the second threshold value when the lost call ratio of the handover calls is smaller than a second predetermined value that is defined as being smaller than the first predetermined value.

9. The call acceptance controlling apparatus as claimed in claim 6, further comprising:
communication load measuring means for measuring a communication load of a radio base station which forms a cell adjacent to the cell formed by the radio base station concerned, and
second threshold adjustment means for increasing and decreasing the second threshold value, based on the communication load measured by the communication load measuring means.

10. The call acceptance controlling apparatus as claimed in claim 9, wherein the second threshold adjustment means decreases the second threshold value when the communication load measured by the communication load measuring means is greater than a seventh predetermined value, and increases the second threshold value when the communication load measured by the communication load measuring means is smaller than an eighth predetermined value that is defined as being smaller than the seventh predetermined value.

11. In a mobile communications system using a code division multiple access method, a call acceptance controlling apparatus for controlling acceptance of new calls and handover calls when a communication through a radio channel is performed between a mobile station in a cell and two or more radio base stations each forming a cell, the call acceptance controlling apparatus comprising:
new call acceptance limiting means for restricting acceptance of a new call before any one of the following events takes place, namely,
an uplink interference amount in each radio channel from each mobile station that communicates with a radio base station to the radio base station reaching a predetermined maximum interference amount of the mobile communications system,
a downlink total transmission power from the radio base station to mobile stations reaching a predetermined maximum power level of the mobile communications system, and
an amount of spread code resources available in the radio base station reaching null,
wherein the new call acceptance limiting means restricts acceptance of a new call before the downlink total transmission power reaches the predetermined maximum power level of the mobile communications system, rejecting the new call to make the new call a lost call, when the downlink total transmission power level exceeds a third threshold value, comprising:
total downlink transmission power measuring means for measuring a total transmission power of the radio base station, and
total downlink transmission power checking means for determining whether the total transmission power measured by the total downlink transmission power measuring means is greater than the third threshold value that is defined as being smaller than the predetermined maximum power level of the mobile communications system.

12. The call acceptance controlling apparatus as claimed in claim 11, further comprising first threshold adjustment means for increasing and decreasing the third threshold value, based on a lost call ratio of handover calls.

13. The call acceptance controlling apparatus as claimed in claim 12, wherein the first threshold adjustment means decreases the third threshold value when the lost call ratio of the handover calls is greater than a third predetermined value, and increases the third threshold value when the lost call ratio of the handover calls is smaller than a fourth predetermined value that is defined as being smaller than the third predetermined value.

14. The call acceptance controlling apparatus as claimed in claim 11, further comprising:
communication load measuring means for measuring a communication load of a radio base station which forms a cell adjacent to the cell formed by the radio base station concerned, and
second threshold adjustment means for increasing and decreasing the third threshold value, based on the communication load measured by the communication load measuring means.

15. The call acceptance controlling apparatus as claimed in claim 14, wherein the second threshold adjustment means decreases the third threshold value when the communication load measured by the communication load measuring means is greater than a ninth predetermined value, and increases the third threshold value when the communication load measured by the communication load measuring means is smaller than a tenth predetermined value that is defined as being smaller than the ninth predetermined value.

16. In a mobile communications system using a code division multiple access method, a call acceptance controlling apparatus for controlling acceptance of new calls and handover calls when a communication through a radio channel is performed between a mobile station in a cell and two or more radio base stations each forming a cell, the call acceptance controlling apparatus comprising:

new call acceptance limiting means for restricting acceptance of a new call before any one of the following events takes place, namely, an unlink interference amount in each radio channel from each mobile station that communicates with a radio base station to the radio base station reaching a predetermined maximum interference amount of the mobile communications system, a downlink total transmission vower from the radio base station to mobile stations reaching a predetermined maximum power level of the mobile communications system, and an amount of spread code resources available in the radio base station reaching null, wherein the new call acceptance limiting means restricts acceptance of a new call before the downlink total transmission power reaches the predetermined maximum power level of the mobile communications system, rejecting the new call to make the new call a lost call, when the total downlink transmission power level exceeds a fourth threshold value, comprising:

total downlink transmission power estimating means for estimating a downlink total transmission power of the radio base station if a requested call is accepted, and total downlink transmission power checking means for determining whether the downlink total transmission power estimated by the total downlink transmission power estimating means is greater than the fourth threshold value that is defined as being smaller than the predetermined maximum power level of the mobile communications system.

17. The call acceptance controlling apparatus as claimed in claim 16, further comprising first threshold adjustment means for increasing and decreasing the fourth threshold value, based on a lost call ratio of handover calls.

18. The call acceptance controlling apparatus as claimed in claim 17, wherein the first threshold adjustment means decreases the fourth threshold value when the lost call ratio of the handover calls is greater than a third predetermined, value, and increases the fourth threshold value when the lost call ratio of the handover calls is smaller than a fourth predetermined value that is defined as being smaller than the third predetermined value.

19. The call acceptance controlling apparatus as claimed in claim 16, further comprising:

communication load measuring means for measuring a communication load of a radio base station which forms a cell adjacent to the cell formed by the radio base station concerned, and second threshold adjustment means for increasing and decreasing the fourth threshold value, based on the communication load measured by, the communication load measuring means.

20. The call acceptance controlling apparatus as claimed in claim 19, wherein the second threshold adjustment means decreases the fourth threshold value when the communication load measured by the communication load measuring means is greater than a ninth predetermined value, and increases the fourth threshold value when the communication load measured by the communication load measuring means is smaller than a tenth predetermined value that is defined as being smaller than the ninth predetermined value.

21. In a mobile communications system using a code division multiple access method, a call acceptance controlling apparatus for controlling acceptance of new calls and handover calls when a communication through a radio channel is performed between a mobile station in a cell and two or more radio base stations each forming a cell, the call acceptance controlling apparatus comprising:

new call acceptance limiting means for restricting acceptance of a new call before any one of the following events takes place, namely, an uplink interference amount in each radio channel from each mobile station that communicates with a radio base station to the radio base station reaching a predetermined maximum interference amount of the mobile communications system, a downlink total transmission power from the radio base station to mobile stations reaching a predetermined maximum power level of the mobile communications system, and an amount of spread code resources available in the radio base station reaching null, wherein the new call acceptance limiting means restricts acceptance of a new call before all the spread code resources of a radio base station is consumed, rejecting the new call to make the new call a lost call, when an amount of the spread code resources available is less than a fifth threshold value, comprising:

spread code resources measuring means for measuring an amount of the spread code resources available in the radio base station, and spread code resources checking means for determining whether the amount of the spread code resources measured by the spread code resources measuring means is less than the fifth threshold value.

22. The call acceptance controlling apparatus as claimed in claim 21, further comprising first threshold adjustment means for increasing and decreasing the fifth threshold value, based on a lost call ratio of handover calls.

23. The call acceptance controlling apparatus as claimed in claim 22, wherein the first threshold adjustment means increases the fifth threshold value when the lost call ratio of the handover calls is greater than a fifth predetermined value, and decreases the fifth threshold value when the lost call ratio of the handover calls is smaller than a sixth predetermined value that is defined as being smaller than the fifth predetermined value.

24. The call acceptance controlling apparatus as claimed in claim 21, further comprising:

communication load measuring means for measuring a communication load of a radio base station which forms a cell adjacent to the cell formed by the radio base station concerned, and second threshold adjustment means for increasing and decreasing the fifth threshold value, based on the communication load measured by the communication load measuring means.

25. The call acceptance controlling apparatus as claimed in claim 24, wherein the second threshold adjustment means increases the fifth threshold value when the communication load measured by the communication load measuring means is greater than an eleventh predetermined value, and decreases the fifth threshold value when the communication load measured by the communication load measuring means is smaller than a twelfth predetermined value that is defined as being smaller than the eleventh predetermined value.

26. In a mobile communications system using a code division multiple access method, a call acceptance controlling method for controlling acceptance of new calls and handover calls, when a communication through a radio channel is performed between a mobile station in a cell and two or more radio base stations each forming a cell, wherein acceptance of a new call is limited before any one of the following events takes place, namely, an unlink interference amount in each radio channel from each mobile station that communicates with a radio base station to the radio base station reaching a predetermined maximum interference amount of the mobile communications system, a downlink total transmission power from the radio base station to mobile stations reaching a predetermined maximum vower level of the mobile communications system, and an amount of spread code resources available in the radio base station reaching null, wherein acceptance of a new call is limited before the uplink interference amount of a radio channel reaches the predetermined maximum interference amount of the mobile communications system, rejecting the new call to make the new call a lost call, when an uplink interference amount of any radio channel exceeds a first threshold value, comprising:

an interference amount measuring step for measuring an interference amount of each uplink radio channel from a mobile station to a radio base station when there is a request for a new call, and an interference amount checking step for determining whether an interference amount of any radio channel measured by the interference amount measuring step is greater than the first threshold value that is defined as being smaller than the predetermined maximum interference amount of the mobile communications system.

27. The call acceptance control method as claimed in claim 26, wherein the first threshold value is increased and decreased, based on a lost call ratio of handover calls.

28. The call acceptance control method as claimed in claim 27, wherein the first threshold value is decreased when the lost call ratio of the handover calls is greater than a first predetermined value, and the first threshold value is increased when the lost call ratio of the handover calls is smaller than a second predetermined value that is defined as being smaller than the first predetermined value.

29. The call acceptance control method as claimed in claim 26, further comprising:

a communication load measuring step for measuring a communication load of a radio base station which forms a cell adjacent to the cell formed by the radio base station concerned, and a threshold adjustment step for increasing and decreasing the first threshold value, based on the communication load measured by the communication load measuring step.

30. The call acceptance control method as claimed in claim 29, wherein the first threshold value is decreased when the communication load measured by the communication load measuring step is greater than a seventh predetermined value, and the first threshold value is increased when the communication load measured by the communication load measuring step is smaller than an eighth predetermined value that is defined as being smaller than the seventh predetermined value.

31. In a mobile communications system using a code division multiple access method, a call acceptance controlling method for controlling acceptance of new calls and handover calls, when a communication through a radio channel is performed between a mobile station in a cell and two or more radio base stations each forming a cell, wherein acceptance of a new call is limited before any one of the following events takes place, namely, an uplink interference amount in each radio channel from each mobile station that communicates with a radio base station to the radio base station reaching a predetermined maximum interference amount of the mobile communications system, a downlink total transmission power from the radio base station to mobile stations reaching a predetermined maximum power level of the mobile communications system, and an amount of spread code resources available in the radio base station reaching null, wherein the acceptance of the new call is restricted before the uplink interference amount of the radio channel reaches the predetermined maximum interference amount of the mobile communications system, rejecting the new call to make the new call a lost call, when an uplink interference amount of any radio channel exceeds a second threshold value, comprising:

an interference amount estimating step for estimating an interference amount of each uplink radio channel if a request for a new call is accepted, and an interference amount checking step for determining whether an interference amount of any radio channel estimated by the interference amount estimating step is greater than the second threshold value that is defined as being smaller than the predetermined maximum interference amount of the mobile communications system.

32. The call acceptance control method as claimed in claim 31, wherein the second threshold value is increased and decreased, based on a lost call ratio of handover calls.

33. The call acceptance control method as claimed in claim 32, wherein the second threshold value is decreased when the lost call ratio of the handover calls is greater than a first predetermined value, and the second threshold value is increased when the lost call ratio of the handover calls is smaller than a second predetermined value that is defined as being smaller than the first predetermined value.

34. The call acceptance control method as claimed in claim 31, further comprising:

a communication load measuring step for measuring a communication load of a radio base station which forms a cell adjacent to the cell formed by the radio base station concerned, and a threshold adjustment step for increasing and decreasing the second threshold value, based on the communication load measured by the communication load measuring step.

35. The call acceptance control method as claimed in claim 34, wherein the second threshold value is decreased when the communication load measured by the communication load measuring step is greater than a seventh predetermined value, and the second threshold value is increased when the communication load measured by the communication load measuring step is smaller than an eighth predetermined value that is defined as being smaller than the seventh predetermined value.

36. In a mobile communications system using a code division multiple access method, a call acceptance controlling method for controlling acceptance of new calls and handover calls, when a communication through a radio channel is performed between a mobile station in a cell and two or more radio base stations each forming a cell, wherein acceptance of a new call is limited before any one of the following events takes place, namely, an uplink interference amount in each radio channel from each mobile station that communicates with a radio base station to the radio base station reaching a predetermined maximum interference amount of the mobile communications system, a downlink total transmission power from the radio base station to mobile stations reaching a predetermined maximum Dower level of the mobile communications system, and an amount of spread code resources available in the radio base station reaching null, wherein the acceptance of the new call is restricted before the downlink total transmission power reaches the predetermined maximum power level of the mobile communications system, rejecting the new call to make the new call a lost call, when the downlink total transmission power level exceeds a third threshold value, comprising:

a total downlink transmission power measuring step for measuring a total transmission power of the radio base station, and a total downlink transmission power checking step for determining whether the total transmission power measured by the total downlink transmission power measuring step is greater than the third threshold value that is defined as being smaller than the predetermined maximum power level of the mobile communications system.

37. The call acceptance control method as claimed in claim 36, wherein the third threshold value is increased and decreased, based on a lost call ratio of handover calls.

38. The call acceptance control method as claimed in claim 37, wherein the third threshold value is decreased when the lost call ratio of the handover calls is greater than a third predetermined value, and the third threshold value is increased when the lost call ratio of the handover calls is smaller than a fourth predetermined value that is defined as being smaller than the third predetermined value.

39. The call acceptance control method as claimed in claim 36, further comprising:

a communication load measuring step for measuring a communication load of a radio base station which forms a cell adjacent to the cell formed by the radio base station concerned, and a threshold adjustment step for increasing and decreasing the third threshold value, based on the communication load measured by the communication load measuring step.

40. The call acceptance control method as claimed in claim 39, wherein the third threshold value is decreased when the communication load measured by the communication load measuring step is greater than a ninth predetermined value, and the third threshold value is increased when the communication load measured by the communication load measuring step is smaller than a tenth predetermined value that is defined as being smaller than the ninth predetermined value.

41. In a mobile communications system using a code division multiple access method, a call acceptance controlling method for controlling acceptance of new calls and handover calls, when a communication through a radio channel is performed between a mobile station in a cell and two or more radio base stations each forming a cell, wherein acceptance of a new call is limited before any one of the following events takes place, namely, an uplink interference amount in each radio channel from each mobile station that communicates with a radio base station to the radio base station reaching a predetermined maximum interference amount of the mobile communications system, a downlink total transmission power from the radio base station to mobile stations reaching a predetermined maximum power level of the mobile communications system, and an amount of spread code resources available in the radio base station reaching null, wherein the acceptance of the new call is restricted before the downlink total transmission power reaches the predetermined maximum power level of the mobile communications system, rejecting the new call to make the new call a lost call, when the total downlink transmission power level exceeds a fourth threshold value, comprising:

a total downlink transmission power estimating step for estimating a downlink total transmission power of the radio base station if a requested call is accepted, and a total downlink transmission power checking step for determining whether the downlink total transmission power estimated by the total downlink transmission power estimating step is greater than the fourth threshold value that is defined as being smaller than the predetermined maximum power level of the mobile communications system.

42. The call acceptance control method as claimed in claim 41, wherein the fourth threshold value is increased and decreased, based on a lost call ratio of handover calls.

43. The call acceptance control method as claimed in claim 42, wherein the fourth threshold value is decreased when the lost call ratio of the handover calls is greater than a third predetermined value, and the fourth threshold value is increased when the lost call ratio of the handover calls is smaller than a fourth predetermined value that is defined as being smaller than the third predetermined value.

44. The call acceptance control method as claimed in claim 41, further comprising:

a communication load measuring step for measuring a communication load of a radio base station which forms a cell adjacent to the cell formed by the radio base station concerned, and a threshold adjustment step for increasing and decreasing the fourth threshold value, based on the communication load measured by the communication load measuring step.

45. The call acceptance control method as claimed in claim 44, wherein the fourth threshold value is decreased when the communication load measured by the communication load measuring step is greater than a ninth predetermined value, and the fourth threshold value is increased when the communication load measured by the communication load measuring step is smaller than a tenth predetermined value that is defined as being smaller than the ninth predetermined value.

46. In a mobile communications system using a code division multiple access method, a call acceptance controlling method for controlling acceptance of new calls and handover calls, when a communication through a radio channel is performed between a mobile station in a cell and two or more radio base stations each forming a cell, wherein acceptance of a new call is limited before any one of the following events takes place, namely, an uplink interference amount in each radio channel from each mobile station that communicates with a radio base station to the radio base station reaching a predetermined maximum interference amount of the mobile communications system, a downlink total transmission power from the radio base station to mobile stations reaching a predetermined maximum power level of the mobile communications system, and an amount of spread code resources available in the radio base station reaching null, wherein the acceptance of the new call is restricted before all the spread code resources of a radio base Station is consumed rejecting the new call to make the new call a lost call, when an amount of the spread code resources available is less than a fifth threshold value, comprising:

a spread code resources measuring step for measuring an amount of the spread code resources available in the radio base station, and a spread code resources checking step for determining whether the amount of the spread code resources measured by the spread code resources measuring step is less than the fifth threshold value.

47. The call acceptance control method as claimed in claim 46, wherein the fifth threshold value is increased and decreased, based on a lost call ratio of handover calls.

48. The call acceptance control method as claimed in claim 47, wherein the fifth threshold value is increased when the lost call ratio of the handover calls is greater than a fifth predetermined value, and the fifth threshold value is decreased when the lost call ratio of the handover calls is smaller than a sixth predetermined value that is defined as being smaller than the fifth predetermined value.

49. The call acceptance control method as claimed in claim 46, further comprising:

a communication load measuring step for measuring a communication load of a radio base station which forms a cell adjacent to the cell formed by the radio base station concerned, and a threshold adjustment step for increasing and decreasing the fifth threshold value, based on the communication load measured by the communication load measuring step.

50. The call acceptance control method as claimed in claim 49, wherein the fifth threshold value is increased when the communication load measured by the communication load measuring step is greater than an eleventh predetermined value, and the fifth threshold value is decreased when the communication load measured by the communication load measuring step is smaller than a twelfth predetermined value that is defined as being smaller than the eleventh predetermined value.

* * * * *